(12) United States Patent
Bell et al.

(10) Patent No.: US 8,756,494 B2
(45) Date of Patent: Jun. 17, 2014

(54) METHODS AND SYSTEMS FOR DESIGNING DOCUMENTS WITH INLINE SCROLLABLE ELEMENTS

(75) Inventors: Bruce Bell, New York, NY (US); Yeming Liu, Bellevue, WA (US); Erin Reynolds, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 186 days.

(21) Appl. No.: 13/027,440

(22) Filed: Feb. 15, 2011

(65) Prior Publication Data

US 2013/0198614 A1 Aug. 1, 2013

(51) Int. Cl.
*G06F 17/00* (2006.01)
*G06F 3/048* (2013.01)

(52) U.S. Cl.
USPC .......................................... 715/240; 715/784

(58) Field of Classification Search
USPC .................. 715/240, 234, 200, 209, 784–787
See application file for complete search history.

(56) References Cited

U.S. PATENT DOCUMENTS

| 5,801,701 | A | * | 9/1998 | Koppolu et al. | 715/821 |
| 5,922,044 | A | * | 7/1999 | Banthia | 709/203 |
| 7,039,863 | B1 | * | 5/2006 | Caro et al. | 715/209 |
| 7,216,300 | B2 | * | 5/2007 | Dang | 715/783 |
| 7,272,781 | B2 | * | 9/2007 | Cote et al. | 715/205 |
| 2001/0043235 | A1 | * | 11/2001 | Best et al. | 345/781 |
| 2004/0123238 | A1 | * | 6/2004 | Hefetz et al. | 715/513 |
| 2012/0054603 | A1 | * | 3/2012 | Demant et al. | 715/247 |

* cited by examiner

*Primary Examiner* — Manglesh M Patel
(74) *Attorney, Agent, or Firm* — Kilpatrick Townsend & Stockton LLP

(57) ABSTRACT

A computerized device can comprise a storage medium and a processor (or other data processing hardware) to implement a bundler module. The bundler module accesses, from the storage medium, data defining an arrangement of document elements and identifies a container frame in the arrangement of document elements. The bundler module searches for a content frame matching the identified container frame, and in response to locating the content frame matching the identified container frame, generates code defining a document. The document comprises HTML or other code that, when processed by a rendering application, provides the content frame as an inline scrollable element.

22 Claims, 4 Drawing Sheets

METHODS AND SYSTEMS FOR DESIGNING DOCUMENTS WITH INLINE SCROLLABLE ELEMENTS

BACKGROUND

Digital content distribution continues to gain in popularity. However, not all designers take full advantage of digital distribution techniques. For example, a designer for a magazine or other document may simply wish to lay out the document using techniques appropriate for print documents and may not have the technical expertise or desire to write HTML or other code for a digital counterpart of the magazine. The resulting document may suffer in quality due to the lack of interactive elements.

SUMMARY

A computerized device can comprise a storage medium and a processor (or other data processing hardware) to implement a bundler module that provides a simplified workflow for designers to specify interactive elements. The bundler module accesses, from the storage medium, data defining an arrangement of document elements and identifies a container frame in the arrangement of document elements. The bundler module searches for a content frame matching the identified container frame, and in response to locating the content frame matching the identified container frame, generates code defining a document. For example, the code can comprise HTML or other code that, when processed by a rendering application, provides the content frame as an inline scrollable element or another interactive element.

This illustrative embodiment is discussed not to limit the present subject matter, but to provide a brief introduction. Additional embodiments include computer-readable media embodying an application configured in accordance with aspects of the present subject matter to provide a bundler module to generate documents with inline scrollable content and computer-implemented methods for providing such documents. These and other embodiments are described below in the Detailed Description. Objects and advantages of the present subject matter can be determined upon review of the specification and/or practice of an embodiment configured in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

Presently-disclosed embodiments include computing systems, methods, and computer-readable media embodying code to implement a bundler application that allows for generation of documents having one or more inline scrollable elements. An "inline scrollable element" refers to a document portion that is scrollable independently from another part of the document (which itself may or may not be scrollable depending on the overall size of the document).

Figure 1:
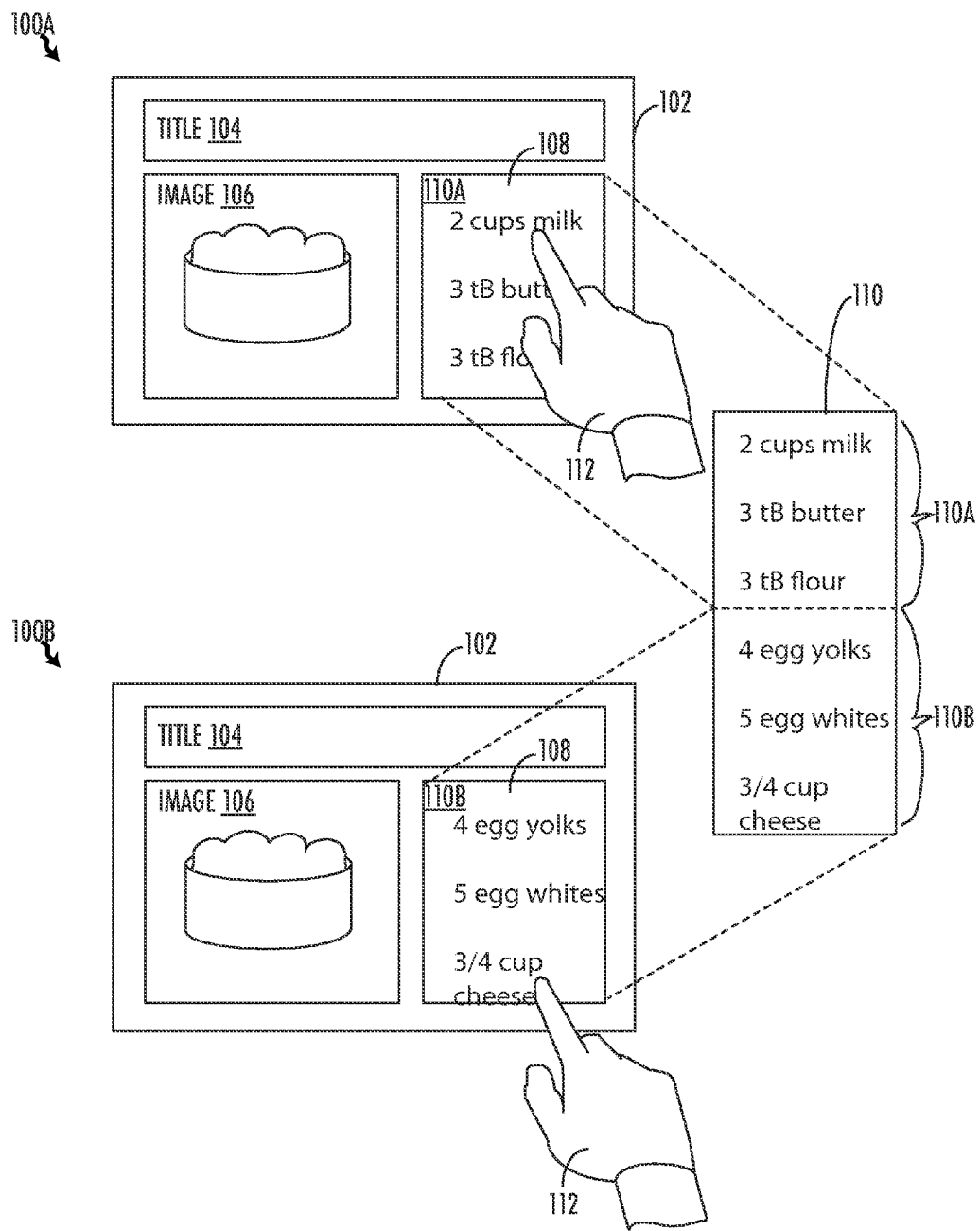
FIG. 1 is a diagram showing an example of an inline scrollable element.

FIG. 1 shows two views 100A and 100B of an illustrative document 102 comprising a recipe, though of course the present subject matter can be used for any type of content. A header portion of document 102 includes a title area 104 and document 102 also includes an image 106 of the final product. An inline scrollable element is included in a frame 108 to display a content element 110 comprising a list of ingredients. For purposes of illustration, the entirety of content element 110 is shown to the side in FIG. 1—as can be seen here, the total height of content element 110 is larger than the area of frame 108 allocated for that element within document 102.

Thus, when document 102 is rendered as shown at 100A and 100B only a portion of content element 110 is visible at any given time. In the view shown at 100A, a first portion 110A of content 110 is visible. In response to input 112, content 110 can be scrolled vertically to reveal second portion 110B of content 110 shown at 100B. In this example, input 112 comprises a touch gesture dragging content 110. Depending on the rendering application, the inline scrollable element may be provided in a frame 108 that features on screen controls (e.g., one or more scrollbars).

Document 102 can be implemented using markup or other code. For example, in one implementation document 102 is implemented as a file recognized by a rendering application such as a browser or a viewer application. Document 102 comprises code specifying one or more inline scrollable elements as overlays along with code that triggers appropriate horizontal and/or vertical scrolling behavior.

A designer, particularly a designer with little or no technical expertise/inclination, may not take advantage of the availability of inline scrollable elements due to the need to code such elements (e.g., as iFrames). However, embodiments configured in accordance with the present subject matter can provide a simplified workflow whereby such designers can take advantage of inline scrollable elements.

Figure 2:
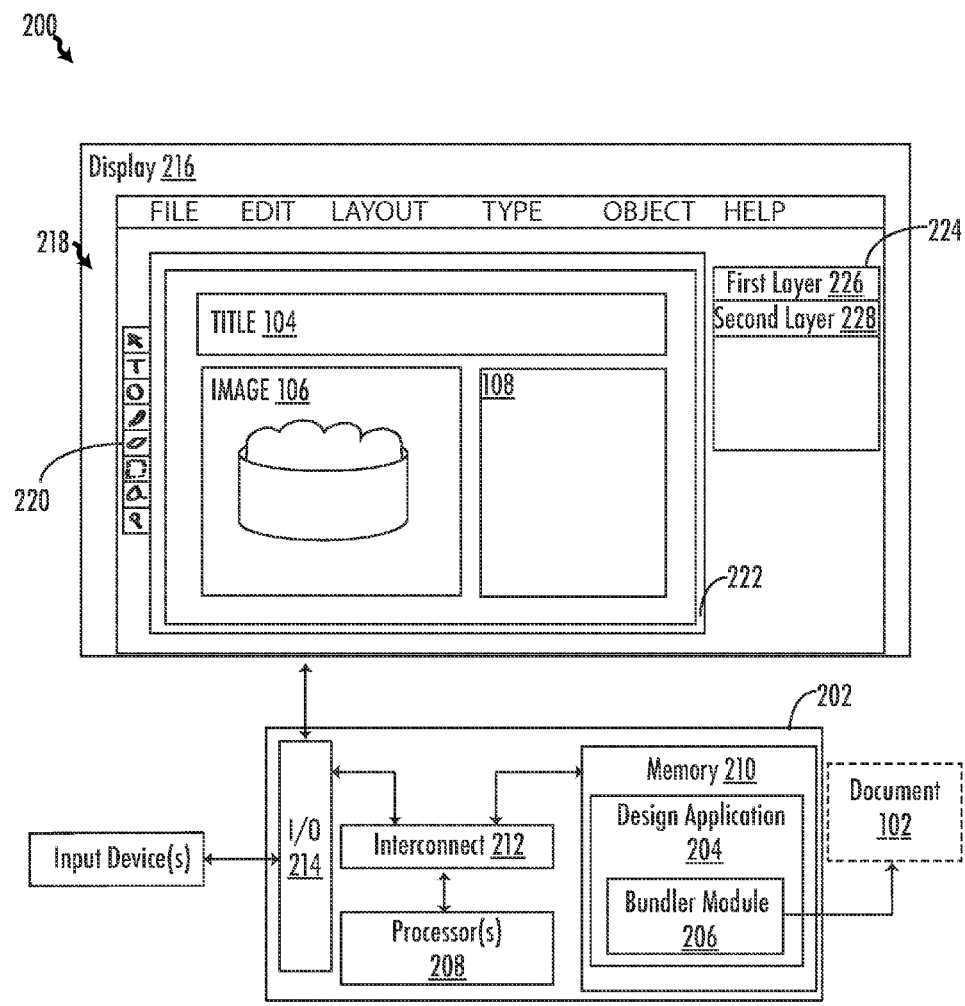
FIG. 2 is a block diagram showing an illustrative computing device implementing a design application for providing documents with one or more inline scrollable elements.

FIG. 2 is a diagram 200 showing an example of a computing device 202. Computing device 202 may alternately be referred to as a data processing system, computerized device, or simply a "computer." Computing device 202 represents a desktop, laptop, tablet, or any other computing system, such as mobile devices (PDAs, smartphones, media players, gaming systems, etc.) or embedded systems (e.g., in vehicles, appliances, or other devices). As shown here, computing device 202 implements a design application 204 featuring a bundler module 206 that provides document 102.

In the example shown in FIG. 2, computing device 202 features a data processing hardware element comprising one or more processors 208 and a computer-readable medium (memory 210) interconnected via internal buses 212, connections, and the like. Bus 212 also connects to I/O components 214, such as universal serial bus (USB), VGA, HDMI, or other display adapter(s), serial connectors, and/or other I/O connections to other hardware of the computing system. The hardware also includes one or more displays 216. It will be understood that computing device 202 could include other components, such as storage devices, communications devices (e.g., Ethernet, radio components), and other I/O components such as speakers, a microphone, or the like. Input device(s) can comprise hardware used to provide input—examples include a keyboard, trackpad, mouse, touch-sensitive display, etc.

Computer-readable medium 210 may comprise RAM, ROM, or other memory and in this example embodies program logic for design application 204 and bundler module 206. In practice, design application 204 can feature additional components. Still further, bundler 206 could be used independently of a design application, such as in a standalone conversion application as a hosted web service. Although design application 204 and bundler module 206 are shown here as program components executed by processor 208, implementations can utilize hardware logic to provide design application 204 and/or bundler module 206 in addition to or instead of using software.

In this example, design application 204 provides a graphical user interface 218 configured to receive input defining a layout of a document. For example, graphical user interface 218 includes a toolbar 220 and a design canvas 222. A user can provide data defining an arrangement of document elements by placing those elements on design canvas 222 as the user desires those elements to appear in the final document. As shown here, elements corresponding to title bar 104 and image 106 have been arranged in canvas 222. Container frame 108 has also been included in the arrangement of elements as a placeholder element but its content is not shown.

In this example, graphical user interface 218 includes a layers panel 224 whereby a user can define and select different layers in the document, which in this example includes first layer 226 and second layer 228. For example, elements 104, 106, and 108 may be arranged in first layer 226 while second layer 228 is used as a reserved layer for content to be included in frame 108. In one implementation, bundler 206 searches for content to include in frame 108 within the reserved layer. For example, container frame 108 may be assigned a name, with content in the reserved layer given an identical name. Accordingly, when bundler 206 processes the data defining the layout of document 102, the scrollable content can be matched to the appropriate frame.

Thus, the workflow for defining inline scrollable elements is greatly simplified. Bundler module 206 can determine whether the frame is to be scrollable based on determining that the content frame has an area larger than an area of the container frame. For example, bundler module 206 can determine if the content frame has a width less than or equal to a width of the container frame but a larger height than the container frame and, in response, generate code that, when processed by the rendering application, provides the content frame as an inline scrollable element with vertical scrolling. On the other hand, if bundler module 206 determines the content frame has a height less than or equal to a height of the container frame but a larger width than the container frame, then in response bundler module 206 can generate code that, when processed by the rendering application, provides the content frame as an inline scrollable element with horizontal scrolling. Of course, if bundler module 206 determines the content frame has both a height and width greater than that of the container frame, bundler module 206 can generate code that provides an inline element with both horizontal and vertical scrolling.

Figure 3:
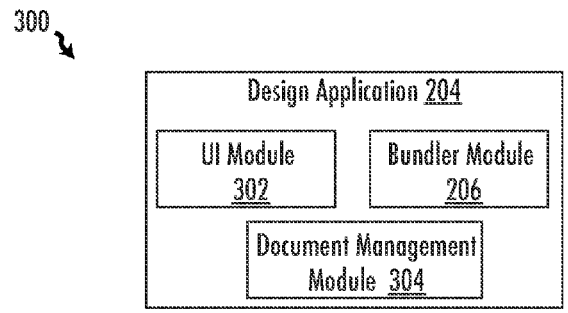
FIG. 3 is a diagram of an illustrative software architecture for a design tool that provides documents with inline scrollable elements.

FIG. 3 is a diagram of an illustrative software architecture 300 for a design application 204 that provides documents with inline scrollable elements. In this example, in addition to bundler module 206, design application 204 includes a UI generation module 302 and a document management module 304. UI generation module 302 can include suitable code to provide interface 218 and to support editing operations such as drag-and-drop, selection and movement of document elements, toolbar commands, and file system operations.

Document management module 304 can keep track of the document elements and their positions as specified by the user input. For example, document management module 304 can keep a set of pointers to visual assets, text boxes, and data defining other constituent elements of the document under design along with coordinate values for the respective elements and identifiers (i.e., element names). Document management module 304 can also store data associating the document elements with respective layers and one another, such as parent-child relationships, along with any labels, tags, or other information to be associated with the document elements.

Bundler module 206, as noted above, uses the data defining the document to generate code that, when rendered, provides the document as laid out at design time. For example, the visual assets, text boxes, and the like can be referenced in HTML or other markup, with style definitions used to control the relative positioning of the elements. The inline scrollable elements can then be defined in one or more overlays within the document. The final document can comprise one or more markup files along with embedded copies of the assets, as needed; of course, some or all of the document elements may rely on linked assets.

Figure 4:
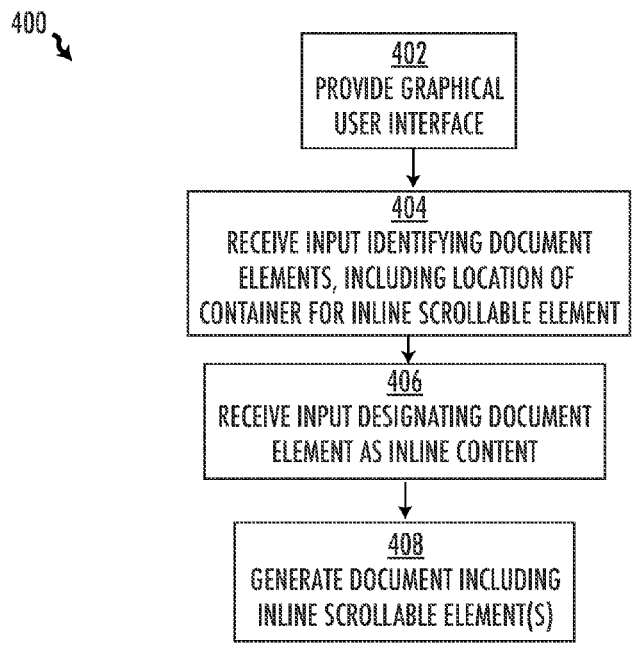
FIG. 4 is a flowchart showing steps in an illustrative processing method for providing a document with one or more inline scrollable elements.

FIG. 4 is a flowchart showing steps in an illustrative processing method 400 carried out by a design application, such as design application 204 of FIG. 2. Block 402 represents providing a graphical user interface configured to receive input defining a layout of a document. For example, an interface with a canvas depicting or simulating a view of the document can be provided where a user can drag-and-drop and otherwise specify contents of container elements and positions of those elements.

Block 404 comprises receiving input identifying a location of a container to be included as an inline element in the document. For example, a user may use a mouse or touch gesture to draw a container frame in an area within the document. Block 406 represents receiving input designating a document element as the inline element.

For example, in some implementations, the graphical user interface comprises a plurality of layers and the input designating the document element as the inline element comprises input associating the designated document element with a layer reserved for inline elements. This can be a manual process in which a user creates names a layer with a reserved name or otherwise designates the layer as the "inline content" layer. However, in some implementations the design application may provide a reserved layer by default.

Other input can be used to designate content of an inline element. For example, the design application may support labeling that may be used to control the document generation process. Accordingly, the input designating the document element as the inline element can comprise input marking a container frame with a label, flag, or other tagging mechanism. The child element (or elements) of the labeled frame will correspond to the content of the inline scrollable element. For example, the child element(s) may be those elements positioned inside the container frame or otherwise associated with the container frame. In such an implementation, generating the document comprises including the designated element in the scrollable frame in response to identifying the label, flag, tag, or another identifier.

Block 408 represents generating the document (i.e. document 102). The document comprises markup or other code that when rendered, provides the designated document element in a scrollable inline frame as noted above. The document can be generated based on a template or skeleton file that is populated based on the particular arrangement and content of document elements. For example, to provide document 102 as depicted in FIG. 1, a basic HTML file may be populated with appropriate elements and style references to position title bar 104, image 106, and container frame 108, with an overlay defined so that inline scrollable content 110 is positioned in frame 108 and behaves as intended.

Figure 5:
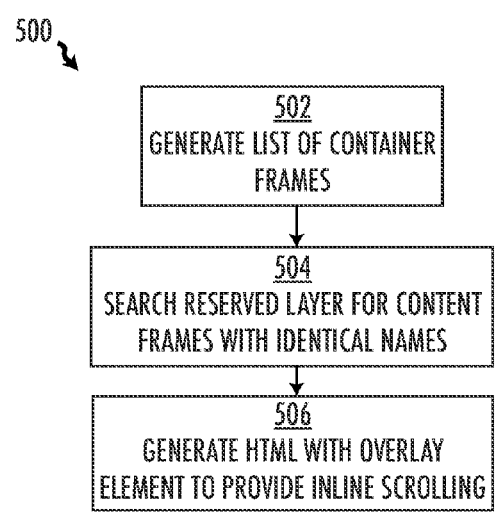
FIG. 5 is a flowchart showing steps in an illustrative document generation process.

FIG. 5 is a flowchart showing steps in an illustrative process 500 for providing a document with one or more inline scrollable elements and which may be carried out during block 408.

For example, when the document is to be generated, bundler module 206 can generate a list of container frames as shown at 502. Then, as shown at block 504, the reserved layer can be searched for content frames with identical names. Each matching content frame can be included at an inline scrollable element at the location specified by its corresponding container frame. Additionally or alternatively to searching within the reserved layer, block 504 can comprise parsing a tag or label for the container frame to determine an identifier for the matching content element (or vice-versa—the content element may include a label identifying the container frame).

Block 506 represents generating the code of the document. For example, code for providing horizontal scrolling behavior can be generated if the content element has a greater width than the container frame and code for providing vertical scrolling behavior can be generated if the content element has a greater height than the container frame. Of course, if the content element is larger in width and height, both horizontal and vertical scrolling can be provided.

Several examples above related to a single inline scrollable element. It will be understood that multiple inline scrollable elements can be included in a document. For example, several different container frames 108 may be specified in a document layout, each frame 108 having a unique name. A plurality of different content frames can be included in a reserved layer, with the different content frames matched to corresponding container frames based on the names of the content frames and names of the container frames. Alternatively, labeling or tagging each container frame as a scrollable element can also be supported as noted above.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

A computing device may access one or more non-transitory computer-readable media that embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, mobile devices (e.g., tablets, smartphones, personal digital assistants (PDAs), etc.), televisions, television set-top boxes, portable music players, and consumer electronic devices such as cameras, camcorders, and mobile devices. Computing devices may be integrated into other devices, e.g. "smart" appliances, automobiles, kiosks, and the like.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Any suitable non-transitory computer-readable medium or media may be used to implement or practice the presently-disclosed subject matter, including, but not limited to, diskettes, drives, magnetic-based storage media, optical storage media (e.g., CD-ROMs, DVD-ROMs, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computerized device, comprising:
   a non-transitory storage medium; and
   a data processing hardware element,
   wherein the data processing hardware element implements a bundler module that:
      accesses, from the non-transitory storage medium, data defining an arrangement of document elements;
      identifies a container frame in the arrangement of document elements;
      identifies a document layer reserved for inline content, wherein the document layer comprises a plurality of content frames, the plurality of content frames comprising a content frame matching the identified container frame, the content frame comprising content;
      searches a subset of the plurality of content frames in the document layer reserved for inline content to locate the content frame matching the identified container frame; and
      in response to locating the content frame matching the identified container frame, generates code that, when rendered by a rendering application, provides for display of the content of the content frame as an inline scrollable element within the container frame, the inline scrollable element comprising at least one of vertical scrolling or horizontal scrolling based at least in part on whether the content frame comprises a first height larger than a second height of the container frame or whether the content frame comprises a first width larger than a second width of the container frame.

2. The computerized device of claim 1, wherein searches a subset of the plurality of content frames in the document layer reserved for inline content to locate the content frame matching the identified container frame comprises:
   determining, for each content frame in the subset, whether that respective content frame and the identified container frame have identical names; and
   in response to determining that the respective content frame and the identified container frame have identical names, determining that the respective content frame matches the identified container frame.

3. The computerized device of claim 1, wherein searches a subset of the plurality of content frames in the document layer reserved for inline content to locate the content frame matching the identified container frame:
   determining whether the identified container frame is labeled as an inline scrollable element; and
   in response to determining that the identified container frame is labeled as the inline scrollable element, determining at least one child element associated with the identified container frame based at least in part on the identified container frame being labeled as the inline scrollable element.

4. The computerized device of claim 1, wherein the inline scrollable element comprises vertical scrolling and horizontal scrolling.

5. The computerized device of claim 1, wherein the bundler module:
   generates a document comprising HTML, the generated document comprising the generated code, wherein the generated document includes the inline scrollable element as an overlay.

6. The computerized device of claim 5, wherein the document comprises at least one other element separate from the inline scrollable element, wherein the document, when rendered by the rendering application, provides for display of the at least one other element outside of the inline scrollable element.

7. The computerized device of claim 1, wherein the data processing hardware element comprises a processor and the bundler module is implemented as a program component executed by the processor.

8. A computer-implemented method, comprising:
   providing, by a design application, a graphical user interface comprising a design canvas for a document to be generated, the graphical user interface configured to receive input defining a layout of the document to be generated, the graphical user interface configured to simulate a view of the layout of the document to be generated on the design canvas, the graphical user interface comprising a layer reserved for inline content;
   receiving, by the design application, input identifying a container element within the document to be generated;
   receiving, by the design application, input identifying a content element comprising content to correspond with the container element, the content element separate from the container element;
   including, by the design application, the content element in the layer reserved for inline content; and
   generating, by the design application, the document by at least:
      identifying the container element;
      searching the layer reserved for inline content to locate the content element corresponding with the container element; and
      in response to locating the content element corresponding with the container element, including the content of the content element as an inline scrollable element within the container element, the inline scrollable element comprising at least one of vertical scrolling or horizontal scrolling based at least in part on whether the content frame comprises a first height larger than a second height of the container frame or whether the content frame comprises a first width larger than a second width of the container frame.

9. The computer-implemented method of claim 8, wherein searching the layer reserved for inline content to locate the content element corresponding with the container element comprises:
   matching a name of the container element with a name of the content element.

10. The computer-implemented method of claim 8, further comprising:
    associating the content element with the container element.

11. The computer-implemented method of claim 10, wherein associating the content element with the container element comprises:
    marking the content element with a label; and
    marking the container element with the label.

12. The computer-implemented method of claim 8, wherein the generated document comprises an HTML document that includes the scrollable inline element as an overlay.

13. The computer-implemented method of claim 8, wherein the view comprises a visual representation of the container element and the visual representation is based at least in part on the content of the content element.

14. The computer-implemented method of claim 8, wherein the graphical user interface configured to receive input defining the layout of the document to be generated comprises:

the graphical user interface being configured to receive input defining an arrangement of document elements within the document to be generated.

15. The computer-implemented method of claim 8, wherein receiving, by the design application, input identifying the container element within the document to be generated comprises:

receiving, by the design application, input drawing the container element in an area on the design canvas.

16. The computer-implemented method of claim 15, wherein the input drawing the container element comprises receiving data from a touch-sensitive input device in response to a gesture on the touch-sensitive input device.

17. The computer-implemented method of claim 8, wherein the inline scrollable element allows horizontal and vertical scrolling.

18. A computer program product comprising a non-transitory computer readable medium embodying program code, the program code comprising:

program code for accessing data defining a document layout;

program code for identifying, in the document layout, a layer reserved for inline content;

program code for identifying a container frame in the document layout, the container frame being outside the layer reserved for inline content;

program code for searching the layer reserved for inline content to locate a matching content frame corresponding to the container frame, the matching content frame comprising content, the matching content frame separate from the container frame; and program code for generating a document, wherein the generated document comprises markup which, when rendered by a rendering application, provides for display of the content of the matching content frame as a scrollable inline element at a location corresponding with the container frame, the scrollable inline element comprising at least one of vertical scrolling or horizontal scrolling based at least in part on whether the matching content frame comprises a first height larger than a second height of the container frame or whether the matching content frame comprises a first width larger than a second width of the container frame.

19. The computer program product of claim 18, wherein the scrollable inline element comprises vertical scrolling and horizontal scrolling.

20. The computer program product of claim 18, further comprising:

program code for providing a graphical user interface comprising a plurality of layers, the plurality of layers comprising a first layer comprising the container frame and a second layer comprising the content frame, the container frame having a first name and the content frame having a second name; and wherein program code for searching the layer reserved for inline content to locate the matching content frame corresponding to the container frame comprises:

program code for searching in the second layer for the content frame having the second name that matches the container frame having the first name.

21. The computer program product of claim 18, further comprising:

program code for receiving input labeling the container frame as the scrollable inline element; and wherein program code for searching the layer reserved for inline content to locate the matching content frame corresponding to the container frame comprises:

program code for searching at least one child of the container frame.

22. The computer program product of claim 18, wherein the document comprises an HTML document that includes the scrollable inline element as an overlay.

\* \* \* \* \*